(12) United States Patent
Ramgopal et al.

(10) Patent No.: US 11,661,007 B2
(45) Date of Patent: May 30, 2023

(54) WIRELESS MIRROR CONTROL DEVICE

(71) Applicant: SMR Automotive Systems India Limited, Bangalor (IN)

(72) Inventors: Brijender Ramgopal, Bidar (IN); Nagaraju Narasimhe Gowda, Bhadravathi (taluk) Shivamogga (IN); Ritesh Kirankumar Mehta, Bengaluru (IN); Ganeshan Narayanan, Hosur (IN); Andreas Herrmann, Winnenden-Baach (DE)

(73) Assignee: SMR Automotive Systems India Limited, Bangalor (IN)

( * ) Notice: Subject to any disclaimer, the term of this patent is extended or adjusted under 35 U.S.C. 154(b) by 355 days.

(21) Appl. No.: 16/883,157

(22) Filed: May 26, 2020

(65) Prior Publication Data

US 2020/0377020 A1    Dec. 3, 2020

(30) Foreign Application Priority Data

May 31, 2019    (IN) .............................. 201941021783

(51) Int. Cl.
*B60R 1/072* (2006.01)
*B60K 37/06* (2006.01)
(Continued)

(52) U.S. Cl.
CPC .............. *B60R 1/072* (2013.01); *B60K 37/06* (2013.01); *B60R 1/074* (2013.01); *B60R 11/04* (2013.01);
(Continued)

(58) Field of Classification Search
CPC ......... B60R 1/072; B60R 1/074; B60R 11/04; B60R 1/08; B60K 37/06;
(Continued)

(56) References Cited

U.S. PATENT DOCUMENTS 6,805,455 B2   10/2004  Nielsen et al.
9,227,568 B1 *  1/2016  Hubbell .................. G02B 5/09
(Continued)

FOREIGN PATENT DOCUMENTS

CN         205131100 U      4/2016
CN         206369887 U      8/2017
(Continued)

*Primary Examiner* — Sath V Perungavoor
*Assistant Examiner* — Tyler B Edwards
(74) *Attorney, Agent, or Firm* — Jones Day

(57) ABSTRACT

The present disclosure relates to a portable, hand held and/or mountable control device for remote controlling at least one device provided by a vehicle. The control device comprises one or more control applications and indicator icons on a touch sensitive display and one or more motion and orientation detection sensors. The control application provided as keys on the display is selected based on user input and based on the user selected control application the device to be controlled can be controlled wirelessly by voice, steering tilt or motion based operation of the control device. Additionally, the control device can determine a fault or a correct completion of controlling by monitoring the devices. The present disclosure also provides a method for remote controlling the at least one device provided by the vehicle.

26 Claims, 13 Drawing Sheets

(51) Int. Cl.
  *B60R 1/074*   (2006.01)
  *B60R 11/04*   (2006.01)
  *B60S 1/02*   (2006.01)
  *B60R 1/08*   (2006.01)

(52) U.S. Cl.
  CPC ......... *B60K 2370/1438* (2019.05); *B60R 1/08* (2013.01); *B60S 1/02* (2013.01)

(58) Field of Classification Search
  CPC ........ B60K 2370/1438; B60K 2370/55; B60K 2370/779; B60K 35/00; B60S 1/02
  See application file for complete search history.

(56) References Cited

U.S. PATENT DOCUMENTS

| | | | |
|---|---|---|---|
| 10,239,456 B1 * | 3/2019 | Tao | ........................... B60R 1/00 |
| 2007/0195997 A1 | 8/2007 | Paul et al. | |
| 2007/0291112 A1 | 12/2007 | Harris | |
| 2021/0229603 A1 * | 7/2021 | Daly, Jr. | ............. G06F 3/04886 |

FOREIGN PATENT DOCUMENTS

| | | | |
|---|---|---|---|
| CN | 206719096 U | 12/2017 | |
| CN | 108116320 A | 6/2018 | |
| EP | 20545140 B1 | 1/2010 | |
| EP | 2834121 A1 | 2/2015 | |
| KR | 10583831 B | 1/2016 | |
| KR | 20170052881 A1 | 5/2017 | |
| WO | 2013131737 A1 | 9/2013 | |

* cited by examiner

WIRELESS MIRROR CONTROL DEVICE

FIELD

The present disclosure relates to a portable, hand held and/or mountable control device for remote controlling at least one device provided by a vehicle.

CROSS-REFERENCE TO RELATED APPLICATION

This application claims the benefit of IN Patent Application No. 201941021783, filed on 2019 May 31 which is incorporated by reference herein in its entirety.

BACKGROUND

Automotive rear view mirror has features such as powerfold, glass drive, memory function, heating and electrochromism. Conventional outer rear view mirrors have many electrical wires routed from mirror to door module control board with a lot of mechanical knobs/switches to control these mirror functions. This methodology occupies a lot of integration space in vehicle and increases over all cost. These mirror solutions also require detailed attention and efforts for mirror integration with automotive vehicle during production due to wires and connections with mechanic al knobs/switches.

It is also noted that while driving, the conventional way of controlling mirrors can become difficult and cumbersome. The driver has to control the mirror via provided mechanical knobs or switches in the door module. While taking left or right turn the driver's field of view is restricted due to standard glass position adjustment and he won't be able to see the extreme ends towards the left or right in the respective direction and inadvertently can scuff the footpaths or pedestrians. In these systems the driver will have no control over mirror heating and electrochromic (dimming) activation or deactivation as the traditional approach is more is sensor based. Moreover, in case of heavy snowfall, it could take longer time to clear mist on the mirror heater.

Advances in rear view mirror control has been brought about by introduction of remote control systems to control some of these features mainly by touch, voice or gesture based activation. EP2834121 describes gesture based automotive control wherein they describe capturing an image from the camera and processing the image for detecting the gestures at specific regions of the vehicle. U.S. Pat. No. 6,805,455 describes a wireless remote controlled mirror with integral lighting to illuminate a subject being viewed in the mirror, while enabling a user to selectively adjust a view of the subject from a remote location. KR20170052881 describes the automatic control of power fold operation mapped with geo-fencing i.e. fold out when the user is within the geo-fencing region and fold in when user moved out the geo-fencing region. A button less vehicle key having gesture recognition as described in WO2013131737 relates to controlling mostly vehicle function within a vehicle by detecting a chronological sequence of movement directions. EP2045140 describes general voice based control of vehicular system which requires multiple voice phrase for feature selection and activation. CN206719096U describes steering wheel tilt sensing and glass position control employing an additional CAN (Controller Area Network) based circuitry for acquiring steering angle values. The cited document requires vehicle network integration for the feature to work. CN205131100U describes voice based control of only glass position. CN206369887U describes about light intensity detection based on ambient sensor and transmitting the activation signal for electrochromic feature over a wireless communication channel.

Many of the current approaches are time consuming, inconsistent and difficult for users to control and the system does not easily recognize the given command. Moreover, the current approaches do not provide a dual control mechanism to control multiple features.

SUMMARY

Thus according to the basic aspect of the present disclosure there is provided a portable, hand held and/or mountable control device for remote controlling at least one device provided by a vehicle comprising:

one or more control applications and at least one indicator icon on a touch sensitive display;

a microcontroller coupled with a wireless communicator;

one or more motion and orientation detection sensors; and wherein the control applications provided as keys on the display is selected based on user input, wherein based on the user selected control application the device to be controlled can be controlled wirelessly by motion based operation of the control device, wherein the motion based operation comprises the control device position, the change of position, the velocity of the change in position and/or the acceleration of the change in position of the control device.

It is another aspect of the present disclosure, wherein the one or more motion and orientation detection sensors is any one of a combination of an accelerometer, gyroscope and/or magnetometer.

It is another aspect of the present disclosure, wherein the micro controller transmits a selected control signal wirelessly to the device to be controlled and the device is controlled based on the control signal.

It is another aspect of the present disclosure, wherein each indicator icon exhibits a first appearance state upon selection of the selected application, a second appearance state upon transmitting the control signal, a third appearance state upon controlling the device to be controlled and/or a fourth appearance state upon detection of a fault.

It is another aspect of the present disclosure, wherein the microcontroller during the control device power on state determines whether there is a fault or a correct completion of the controlling by monitoring the devices and thereby upon detection of a fault transmits the fault via at least the one indicator icon.

It is another aspect of the present disclosure, wherein a memory and/or Blockchain stores control signals, selected control applications, determined motions of the control device and/or determined faults of the controlling of the device to be controlled.

It is another aspect of the present disclosure, wherein the control signal controls power folding, position adjusting heating, dimming and/or cleaning of at least a part of the rear view device.

It is another aspect of the present disclosure, wherein the device to be controlled is provided by a rear view device, which comprises a reflective element, a camera and/or a display element.

It is another aspect of the present disclosure, wherein to provide a system for remote controlling at least one device provided by a vehicle comprising;

a portable, hand held and/or mountable control device; and a device to be controlled, wherein a microcontroller coupled to a wireless communicator in the control device transmits a control signal wirelessly to the device to be controlled, wherein the control signal is generated by motion based operation of the control device, wherein the device to a controlled having transceiver means receives the control signal thereby triggering a function based on a control application selected by a user, wherein the control device microcontroller is configured to identify from the signal wirelessly received from the device to be controlled the function activation and activate a corresponding indicator icon on the control device, wherein the control device microcontroller in the power on state determines whether there is a fault or a correct completion of the controlling by monitoring the devices and transmits the fault via at least one indicator icon, and wherein a memory and/or Blockchain of the control device stores control signals, selected control applications, determined motions of the control device and/or determined faults of the controlling of the device to be controlled.

It is another aspect of the present disclosure, wherein the transceiver means comprises a microcontroller coupled to a wireless transceiver.

It is another aspect of the present disclosure, wherein the control signal controls power folding, position adjusting, heating, dimming and/or cleaning of at least a part of the device to be controlled.

It is another aspect of the present disclosure, wherein the device to be controlled is provided by a rear view device, which comprises a reflective element, a camera and/or a display element.

In another aspect of the disclosure a method is described for remote controlling at least one device provided by a vehicle via a portable, hand held and/or mountable, preferably wireless, control device, said method comprising the following steps:

providing one or more control applications by the control device, indicating a selected control application in response to a user input into the control device, transmitting a control signal associated with each selected control application from the control device to the device to be controlled, and controlling the device to be controlled based on the control signal, wherein the selection of the control application is motion based with the control device being operated by moving the same in space.

It is another aspect of the present disclosure, wherein the position, the change of position, the velocity of the change in position and/or the acceleration of the change in position of the control device is determined for the motion based operation of the control device.

It is another aspect of the present disclosure, wherein the motion of the control device is determined by using an accelerometer, gyroscope and/or magnetometer.

It is another aspect of the present disclosure, wherein providing the one or more control applications comprises displaying the one or more control applications on a display of the control device, in particular via a key on a touch screen, and/or indicating the selected application comprises displaying the selected application, in particular via at least one indicator icon.

It is another aspect of the present disclosure, wherein further comprising monitoring the controlling of the device to be controlled based on the control signal, and determining whether there is a fault or a correct completion of the controlling.

It is another aspect of the present disclosure, wherein further comprising indicating any determined fault and/or correct completion, preferably on the display of the control device and/or by transmitting a fault and/or correct signal.

It is another aspect of the present disclosure, wherein each indicator icon exhibits, a first appearance state upon selection of the selected application, a second appearance state upon transmitting the control signal, a third appearance state upon controlling the device to be controlled, and/or a fourth appearance state upon detection of a fault.

It is another aspect of the present disclosure, wherein the device to be controlled is provided by a rear view device, which comprises a reflective element, a camera and/or a display element, and the control signal controls power folding, position adjusting, heating, dimming and/or cleaning of at least a part of the rear view device.

It is another aspect of the present disclosure, further comprising storing control signals, selected control applications, determined motions of the control device and/or determined faults of the controlling of the device to be controlled in a memory and/or Blockchain.

It is another aspect of the present disclosure, further comprising
receiving data of the vehicle,
determining data of the surrounding of the vehicle,
detecting data indicating the condition of a user in the vehicle, and/or
extracting data from the memory,
when controlling the device to be controlled and/or providing the one or more control applications.

It is another aspect of the present disclosure, further comprising self-learning of control means and/or control applications provided by the control device, the device to be controlled and/or the vehicle, preferably based on the data transmitted, received, determined, detected and/or extracted.

DETAILED DESCRIPTION

Figure 1:
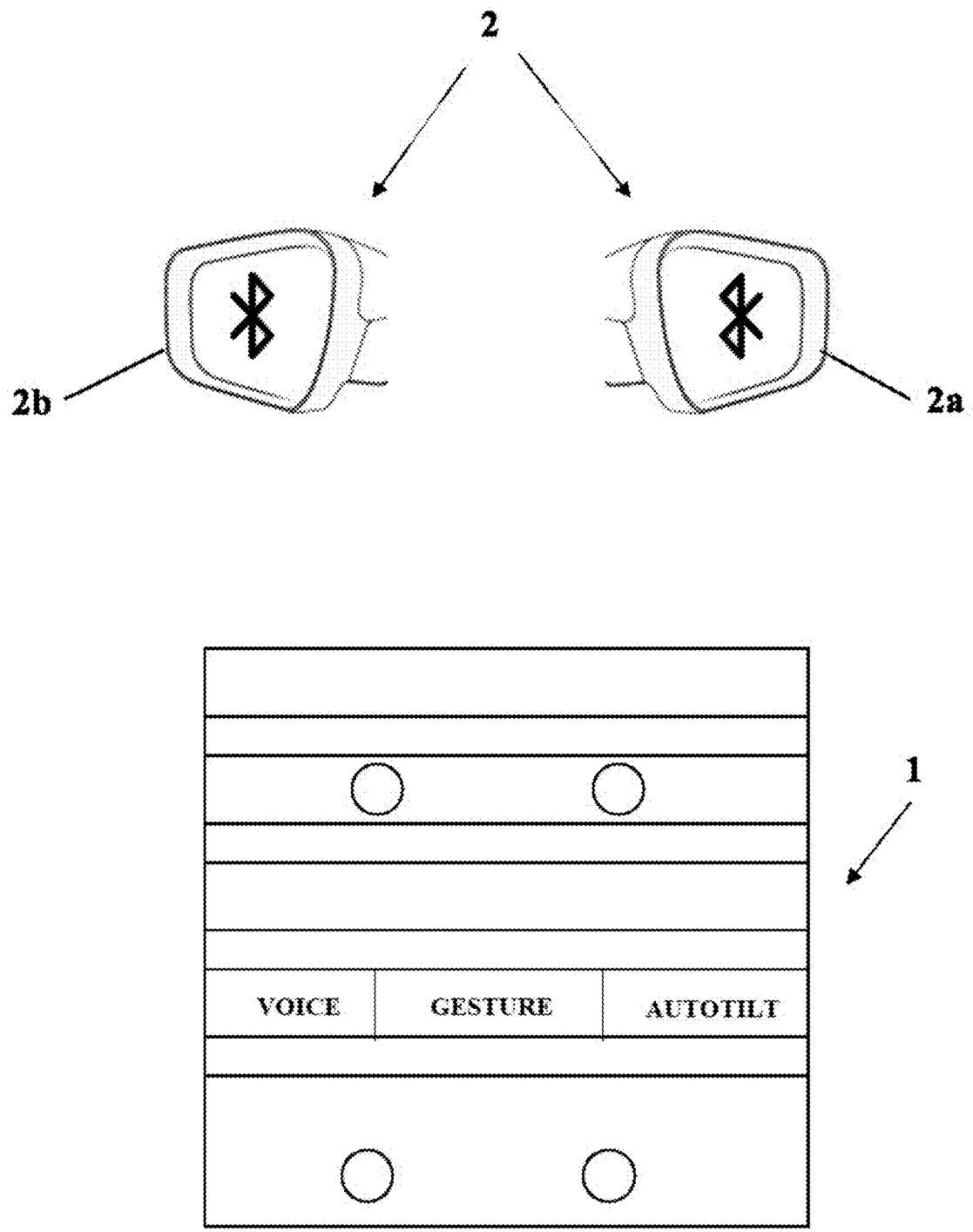
FIG. 1 represents a control device to manage device to be controlled according to the present disclosure.

In the following description of the variations of the present disclosure, reference is made to the accompanying drawings which form a part hereof and in which is shown by way of illustration specific variations in which the disclosure may be practiced. It is understood that other variations may be utilized and structural changes may be made without departing from the scope of the present disclosure. The "and/or" term as used herein refers to any and all combinations of one or more of the mentioned components or features.

The present disclosure relates to a portable/hand held or mountable control device that can be used to wirelessly control applications relating to a rear view device provided by a vehicle and a method of controlling the same. More specifically the present disclosure is directed to controlling a rear view device through a low energy Bluetooth connection established between the control device and the rear view device. The rear view device comprises a reflective element, camera, a display element and an electronic control unit (ECU) programmed as wireless peripherals both on passenger and driver side. The rear view device henceforth will be referred to as a device to be controlled throughout this application. The control device is programmed as wireless central device which can transmit control signal to each of the device to be controlled over a wireless network. The control device is used to control the device to be controlled function and provides a user with dual control functionality either as a voice command based or gesture based depending on user choice. The gesture based command is motion based i.e. the device has built in sensors and based on the movement of control device by holding the device in the user hand and moving it in different directions or motion as a result of mounting the device on to a steering wheel and controlling the device to be controlled functions based on steering tilt. The former motion based method can be applied to control a number of device to be controlled functions but the latter method can be applied to glass or reflective element position adjustments only. The device is also equipped with microphone to receive voice commands from the user. The control device is provided with a touch sensitive display on which is displayed one or more control applications and indicator icons. There are three modes of control represented by these control applications, they are voice control, device motion based and steering auto tilt. User can choose any mode of control based on which indicator icon highlights to show the user that the chosen application is now active and prompting the user to execute the next action which can be a voice command, motion based command or action based on steering auto tilt. The user initiated command is send by the control device as a control signal to the device to be controlled. The ECU of the device to be controlled receives the commands from control device and actuates desired motor or activates the desired functions. Further, the control device during the power on state of the device monitors whether there is a fault or a correct completion of the controlling by monitoring the devices and thereby upon detection of a fault transmits the indication to the user through the indicator.

The control commands enable the user to fold in or fold out the device to be controlled, adjust reflective element positions to up, down, right or left direction, can save reflective element positions, recall saved reflective element position, increase or decrease reflective element heating, increase or decrease reflective element dimming and/or activate cleaning. The control device has a memory to save voice commands, reflective element positions and faults with historical time stamp. The concept of using built in sensors to detect the voice and motion based commands and accordingly control the device to be controlled in vehicles can be extended to smartphones. The smartphone can provide a user interface such as a touch screen with buttons to send commands via wireless communication to the device to be controlled to control different functions.

Figure 2:
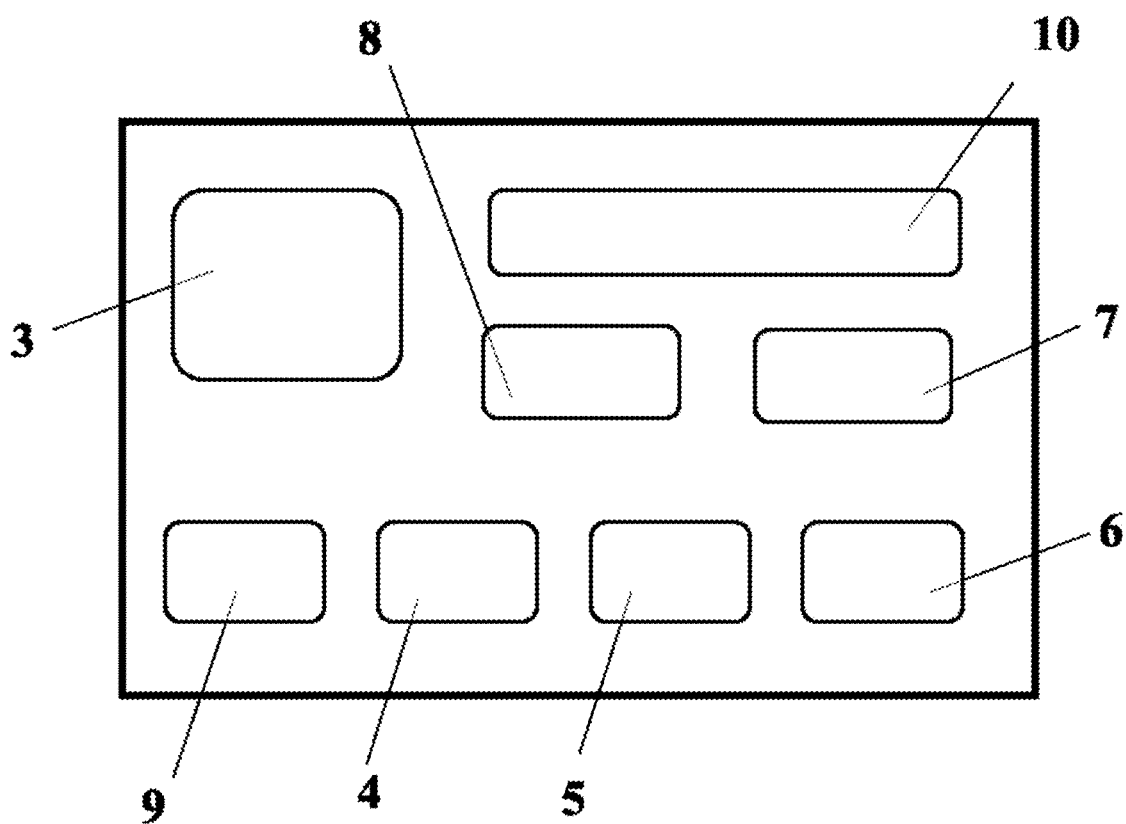
FIG. 2 represents components of a control device with wireless communicator according to the present disclosure.

Referring now to the figures, and more particularly to FIGS. 1 through 13, there are shown variations of the present disclosure. Referring to FIG. 1, the control device (1) is programmed as wireless central device which can transmit wireless control signal to each of the device to be controlled (2) over a wireless network and the device is controlled based on the control signal. The wireless network used is low energy Bluetooth (BLE) connection established between the control device and the device to be controlled. It may be noted that the wireless communication as used in the present disclosure should not be restricted to BILE alone, rather other forms of wireless communications such as Zigbee, WiFi, GSM, Infrared, RF transceiver, 6LoWPAN, LoRaWAN etc. may be used. The control device can control a right (2*a*) as well as a left (2*b*) device to be controlled independent of each other. FIG. 2 shows an internal block diagram of the control device. The control device (1) has a wireless communicator coupled to a microcontroller (3) motion and orientation detection sensors, microphone (7) to receive voice commands, a speaker (9) and an in-built battery (10). The microcontroller is interfaced with a memory (8) to save voice commands, reflective element positions and faults with historical time stamps. The in-built motion and orientation detection sensors comprises any one of a combination of a gyroscope (4), accelerometer (5), and/or magnetometer (6) sensors.

Figure 3:
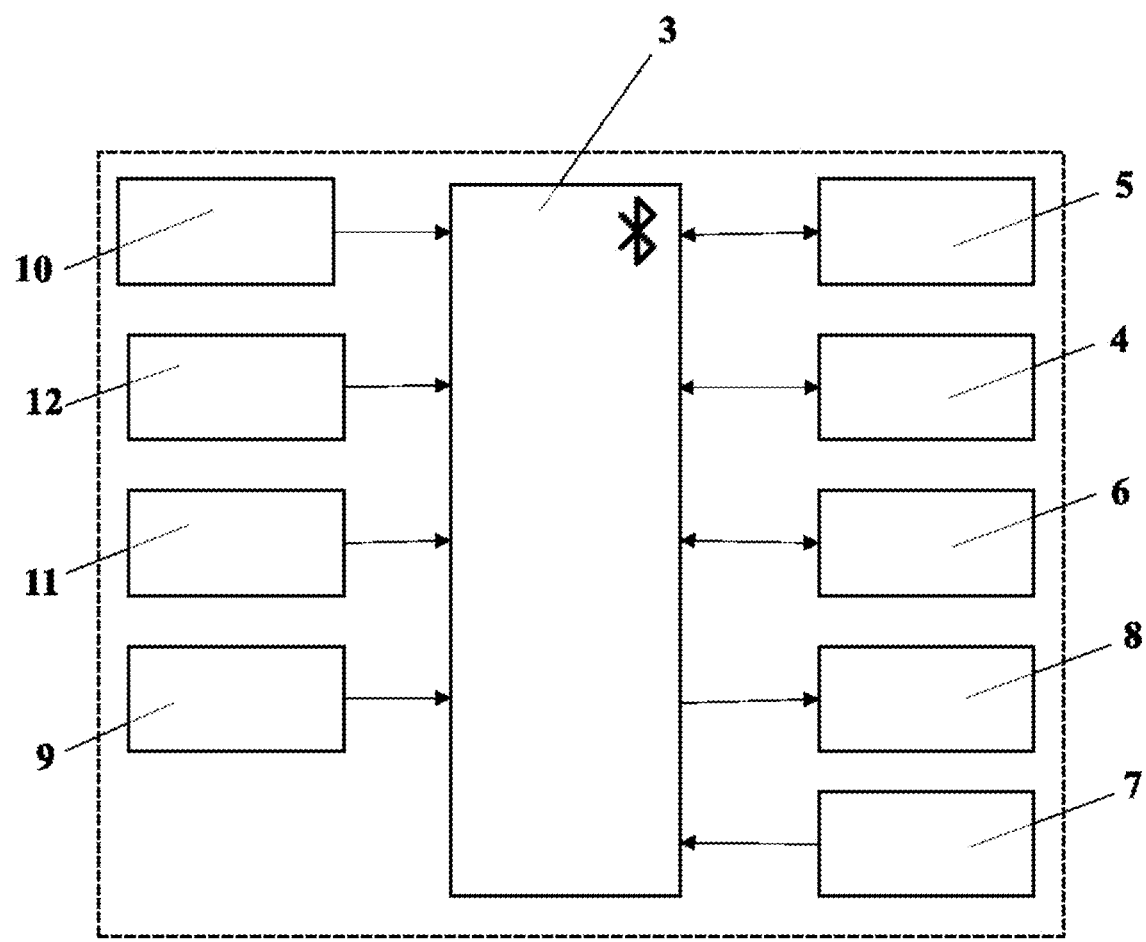
FIG. 3 represents signal transmission within the control device according to the present disclosure.
Figure 4:
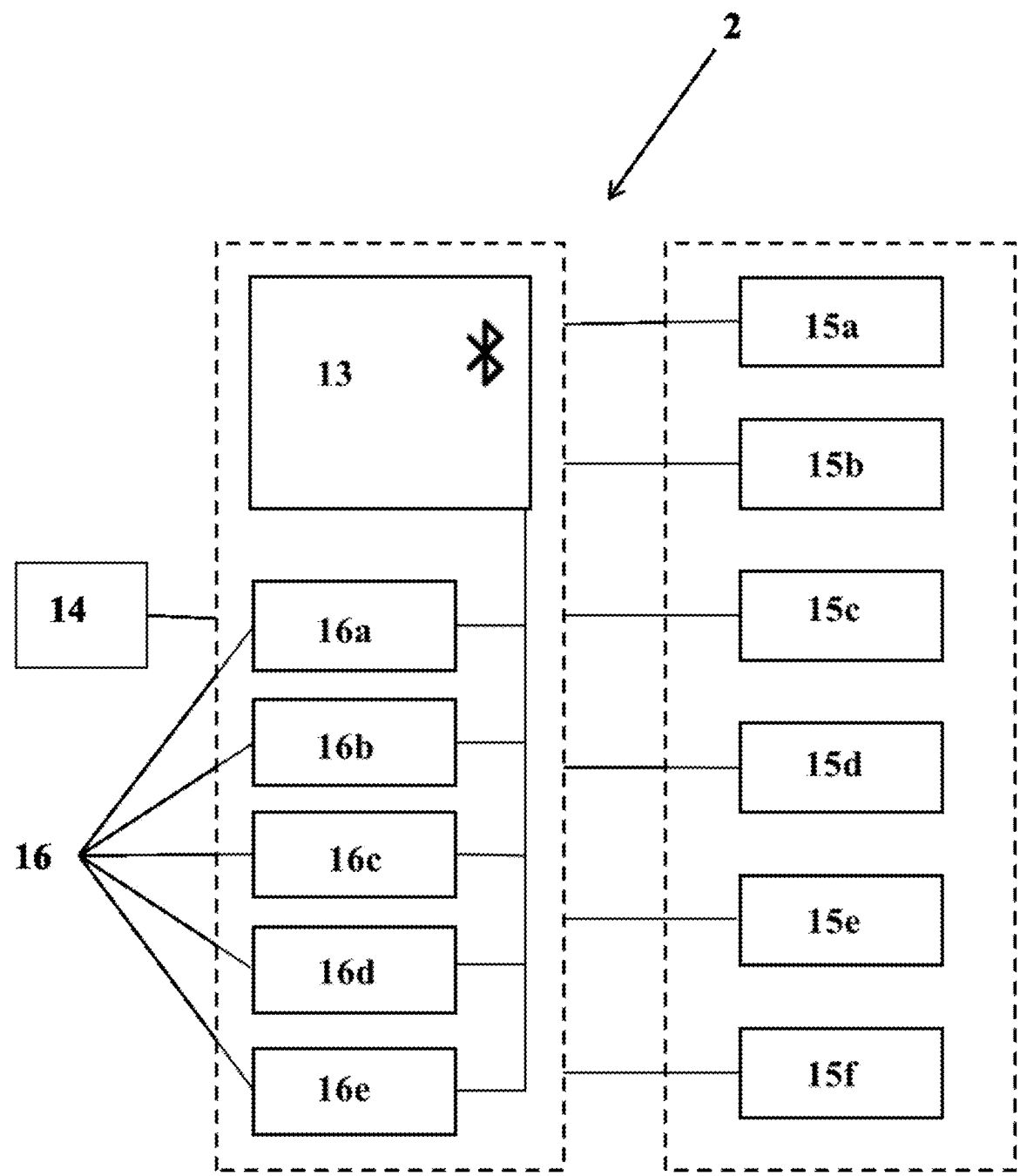
FIG. 4 represents ECU of the device to be controlled with wireless/Bluetooth transceiver according to the present disclosure.
Figure 5:
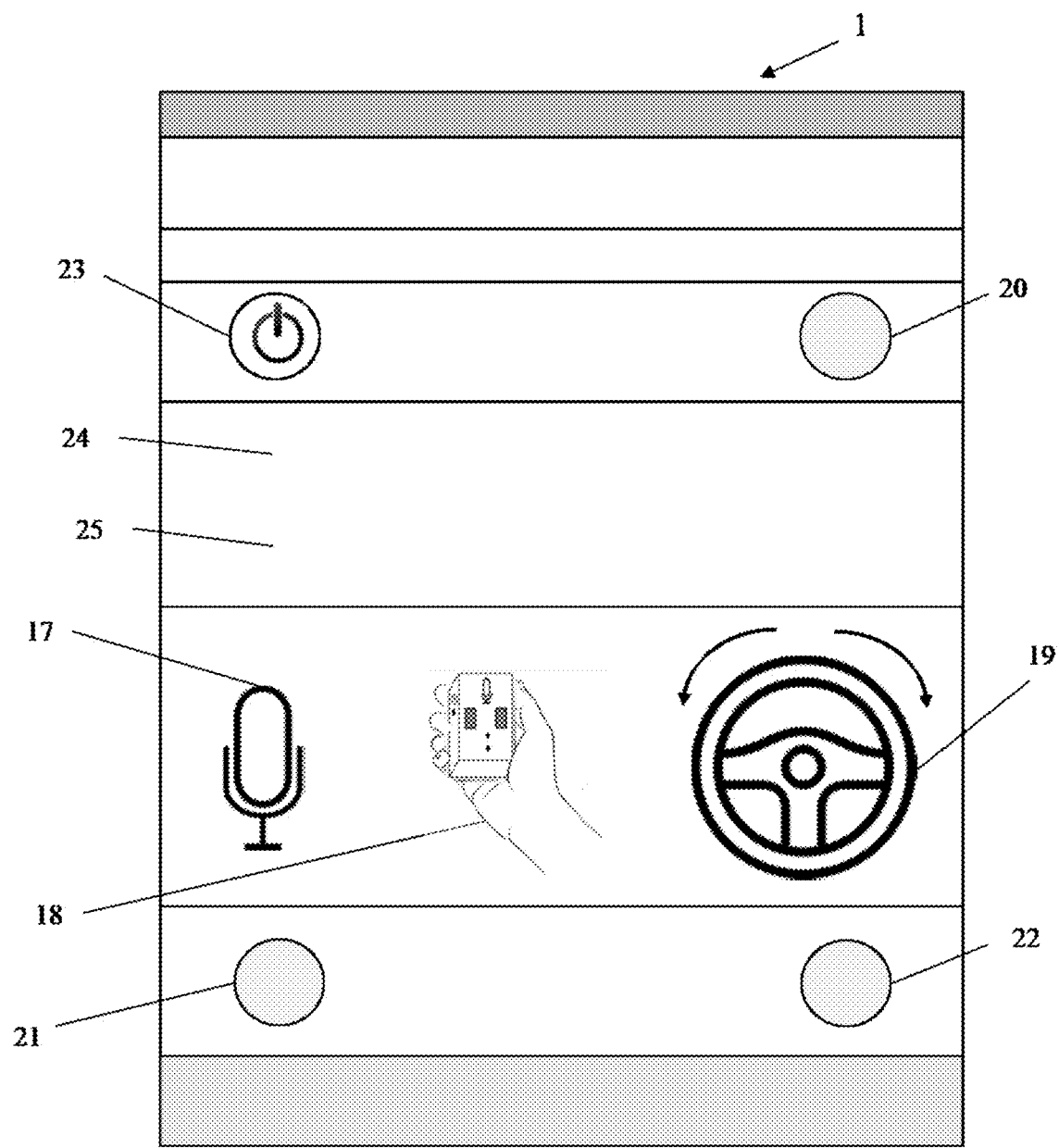
FIG. 5 represents a touch screen display of the control device with a user interface having virtual buttons or keys according to the present disclosure.

FIG. 3 represents a block diagram of the control device (1) with wireless communicator coupled to the microcontroller (3) showing how the signal transmission occurs from the different components of the control device. As seen from the figure there is a two way communication of data between the sensors (4, 5 and 6), the memory (8) and the microcontroller (3). Application based touch keys (12) on the device transmit the user input data to the microcontroller (3). The sensors (4, 5 and 6) send collected data to the microcontroller (3) for decision making for motion based or steering tilt based function activation and the microcontroller (3) sends configuration and control data to the sensors (4, 5 and 6). User inputs for voice based functionality activation are captured by the microphone (7) and transmitted to the microcontroller. The desired voice feedback is transmitted from the microcontroller to the speaker (9). Based on the different function activation the microcontroller transmits signals to the indicators (11). The device is powered by the battery (10). FIG. 4 shows a diagram of the electronic control unit (ECU) of the device to be controlled (2) of a vehicle. The device to be controlled ECU has a transceiver means which comprises a microcontroller (13) coupled to a wireless transceiver and several driver circuits (16) which are powerfold motor driver (16*a*), glass motor driver (16*b*), heater driver (16*c*), EC driver (16*d*) and a driver (16*e*) for cleaning applications, to control the applications for power fold in/fold out guided by a powerfold motor (15a), reflective element adjustment in different directions guided by a glass drive motor (15c), and other features like memory (15b), heating control (15d), electrochromic control (15e) and/or control of cleaning applications (15f). Based on the received functional activation command via wireless transceiver, the microcontroller (13) sends the desired signals to the driver circuits (16). The microcontroller (13) and the several driver circuits (16) are powered by a battery (14). FIG. 5 represents display of the control device (1) according to the present disclosure. The touch sensitive display (24) represents a graphical user interface that has one or more control applications presented in the form of keys and at least one indicator icon displayed on a main display area (25). The control applications involves the control for voice command (17), device motion based command (18), or steering auto tilt based control command (19). The indicator icon comprises a power control indicator (20), an active state indicator (21) to confirm the active state of the selected application and a fault indicator (22). The indicators function to highlight various states when the control device or applications are in use. The different states can be represented by each of these indicator icons or by any one indicator icon, or by more than one indicator icons as shown by the display. When the device is not powered, the indicators are not displayed on the main display area. When a user switch on the control device by selecting a power on button (23) on the main display area, the power control indicator (20) performs two simultaneous operations i.e. the power control indicator (20) comprises a first indication for power on state and a second indication for a wireless connection state which is achieved after the control device is connected wirelessly to the device to be controlled. While the device is scanning for wireless connection, the power control indicator (20) highlights a particular colour for example red and when the control device (1) is successfully connected with the device to be controlled (2), the power control indicator highlights a different color, for example green. When any of the control application (17, 18 or 19) is activated, the active state indicator (21) highlights a specific color corresponding to the application. For example, the active state indicator (21) can light up as blue for voice control, green for gesture control option and yellow for steering tilt option. In other words the active state indicator shows a first appearance state on selection of the selected application. When the user control application command is transmitted by the control device as the control signal to the device to be controlled, the active state indicator shows a second appearance state indicated by a different color highlight. When the ECU of the device to be controlled receives the commands from the control device and activates desired motor or desired functions or controls the device to be controlled, the active state indicator shows a third appearance state represented by a different color highlight. Further, the control device during the power on state of the device monitors whether there is a fault or a correct completion of the controlling by monitoring the devices and thereby upon detection of a fault transmits the indication to the user through the fault indicator which highlights a color, i.e. displays a fourth appearance state upon detection of a fault. The control device can be switched off by continuously pressing a power on/off button (23) and a successful turn off is indicated by absence of indicators.

The present disclosure further describes a process for remote controlling the device to be controlled by the portable, hand held and/or mountable preferably wireless, control device by receiving data from the vehicle, vehicle surroundings, data indicating the condition of the user in the vehicle and/or from memory. When a user input a touch gesture on one of the control application keys displayed on the main display area of the control device (1) the corresponding application is activated. A sub display area (26) with a resulting content is displayed indicating the selected control application in response to the user input. Activated application based request is send to the micro controller (3) which activates its execution by transmitting a control signal associated with each of the selected application from the control device (1) to either or both of the device to be controlled (2a, 2b). The wireless signal transmission is aided by the wireless communicator coupled to the microcontroller. On receiving this control signal by the device to be controlled, a corresponding function such as power folding, position adjusting, heating, dimming and/or cleaning of at least a part of the device to be controlled is initiated. When this function has been triggered, a signal is transmitted back to the control device microcontroller, which in turn identifies function activation. Each of the indicator icons present on the display area highlight various states when the control device or applications are in use such as a first appearance state upon selection of the selected application, a second appearance state upon transmitting the control signal and a third appearance state upon controlling the device to be controlled and a fourth appearance state upon detection of a fault. When the user selects the control application related to the device motion based command, the microcontroller activates the sensors based for motion based commands. The accelerometer (5), gyroscope (4) and/or magnetometer (6) sensors detects the device motion in space i.e. movement of the device in space or tilting along either of a coordinates of x, y or z directions. The accelerometer (5) determines an acceleration value associated with the control device, whereas the gyroscope (4) measures angular rotation associated with the control device and the magnetometer (6) is used to detect device orientation change which is useful to determine the relative position of the control device (1) and in the selection of the device to be controlled (2a, 2b). The position, change in position, velocity of change in position and/or acceleration of the change in position of the control device is determined for the motion based operation of the control device. The motion based command comprises any one of a command for control of power fold in, power fold out, reflective element position adjustment in up, down, left and right direction, heating increase or decrease, dimming increase or decrease, reflective element position memory save, reflective element position memory recall and/or cleaning and is used to control both mirrors together or individual control of mirrors. Motion based command data are stored in the control device memory. When the user performs the gesture of moving the device for function activation, the motion based data obtained in real time by the control device microcontroller is compared with the stored data and if there is a match the corresponding control signal is sent for function activation. The device provides an option to the user to train the control device based on the device movement or motion commands and map it with a specified feature or function to control the device to be controlled (2). Individual device to be controlled selection can be done with motion controls and a specific motion based command can be stored by the user in the control device.

Figure 6:
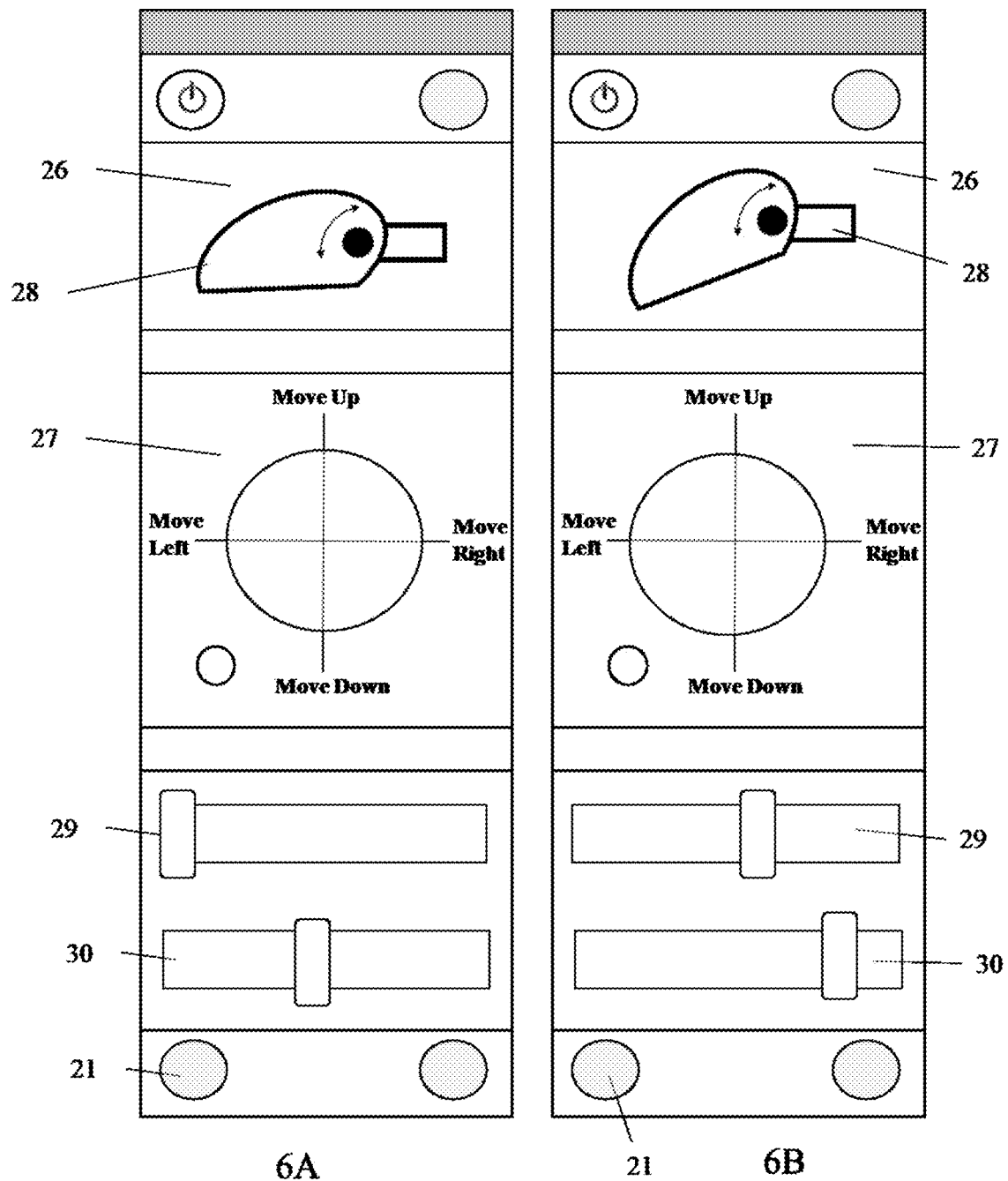
FIG. 6 represents a graphical representation of status of individual functions on the display of the control device according to the present disclosure.

FIG. 6 represents a graphical representation of status of individual functions. During movement of the device (1) by the user with regard to the control applications relating to powerfold or position adjustment, the control device on the sub display area (26) shows a moving graphical/virtual object. The microcontroller is able to regulate on the display the position of the virtual/graphical object based on sensor information that corresponds to the hand held control device motion and corresponding function of the device to be controlled. For example as shown in the FIG. 6 the glass position (27) in different direction can be represented on the sub display area (26) graphically by a rolling ball on x-y coordinate canvas. The powerfold position (28) can be displayed as an open or closed state of the device to be controlled on the display. In case the device motion is to control heating, the heating level (29) is represented on the display screen with a slider user interface which shows the level of heating in percentage. For example to control heating function in the device to be controlled the control device motion as swipe the device right diagonal upward direction will increase the heating to level 1 and similar consecutive command will increase the heating to further levels which is represented by the slider user interface. In case the motion corresponds to dimming, the dimming level (30) can be represented on a graphical screen with a slider user interface which shows the level of dimming in percentage. For example, moving the device in right direction would decrease the levels of heating and right diagonal downward movement of the device would turn off the heating, which is represented accordingly be the slider user interface. FIG. 6-A shows an example of the sub display area (26) which shows the representation of the applications selected by the user as the device to be controlled in a fold-in position, the reflective element movement adjusted towards left and down position, heating off and dimming adjusted to a mid-level. FIG. 6-B shows another example of the sub display area (26) which shows the representation of the applications selected by the user as the device to be controlled in a fold-out position, the reflective element movement adjusted towards left and down position, heating adjusted to a mid-level and dimming increased further to 77 percent. Other features such as cleaning can be represented in a similar manner on the display by a different icon (not shown in the figure). The positional information based on sensor data in accordance with the device motion is transmitted to the micro controller. Further the positional information is processed and transmitted wirelessly to the device to be controlled for activation of the corresponding application in the device to be controlled. On successful selection of the control application, transmission of the control signal and function activation, the active state indicator highlights a different color corresponding to the different stages of control.

Figure 7:
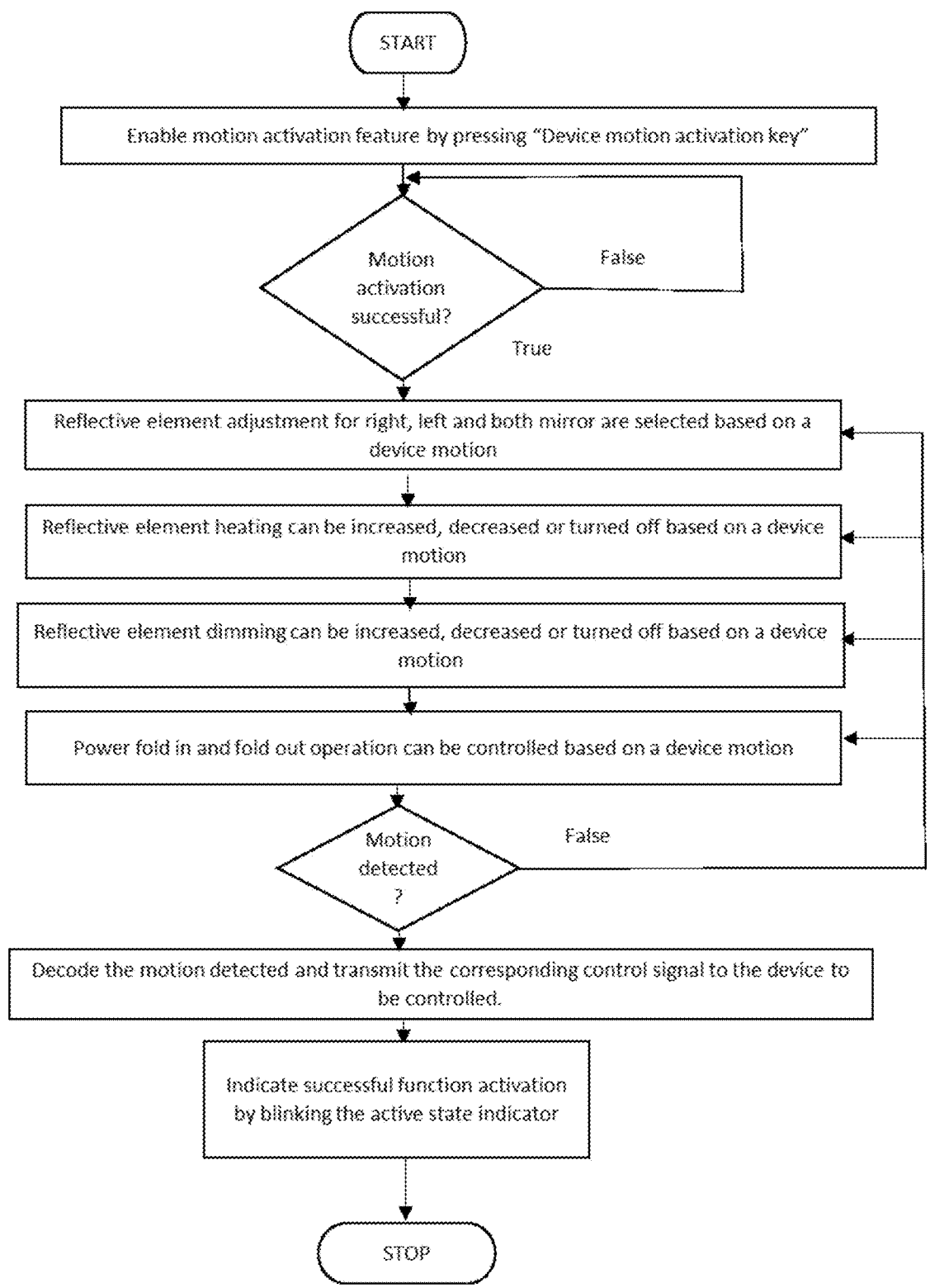
FIG. 7 represents a flow chart illustrating a process of motion based control according to the present disclosure.

FIG. 7 represents a flow chart illustrating activation of the control device in accordance with device based motion command in accordance with the present disclosure. The user need to select the application relating to the device based motion. Based on the movement of the device in various directions the corresponding control signal is transmitted to the device to be controlled ECU. For example reflective element adjustment for right, left or both mirrors are selected based on the user movement of the control device by rotating the device 90° right, 90° left or pointing the device away from the user respectively. Reflective element heating can be increased, decreased or turned off based on a device motion, for example by moving the device in diagonal right upward, right and diagonal right downward directions respectively. Reflective element dimming can be increased, decreased or turned off based on a device motion, for example by moving the device in diagonal left upward, left and diagonal left downward directions respectively. Power fold in and fold out operation can be controlled based on a device motion, for example by moving the device in upward and downward direction. Cleaning can be controlled by device motion in upward and right direction. These motion based gestures send the signal to the ECU of the device to be controlled to activate the corresponding function in the device to be controlled. The control device microcontroller is configured to identify from the signal wirelessly received from the device to be controlled the activation of the function of the device to be controlled in response to the request and activate the corresponding active state indicator icon which highlights a color or flashes.

Figure 8:
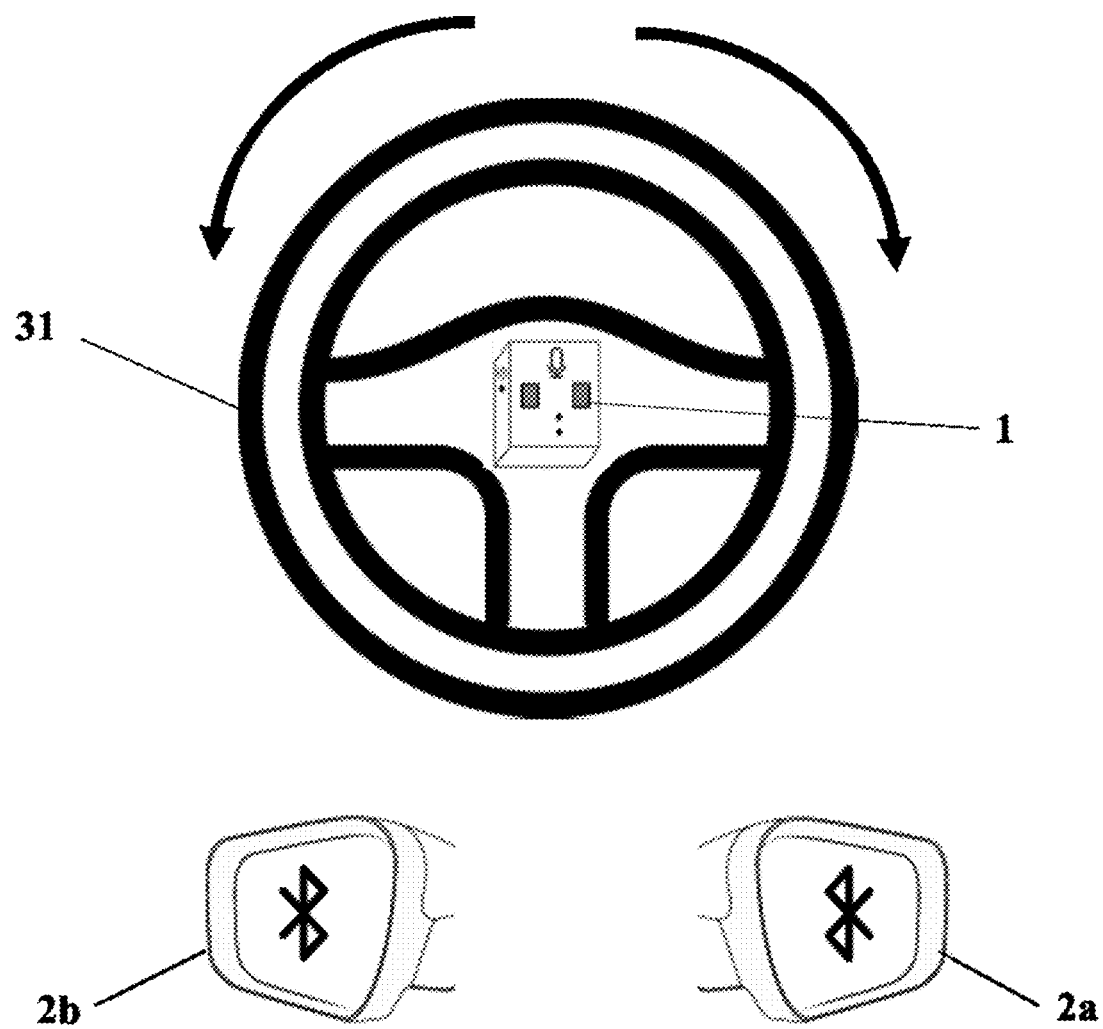
FIG. 8 represents the control device mounted on the steering wheel according to the present disclosure.
Figure 9:
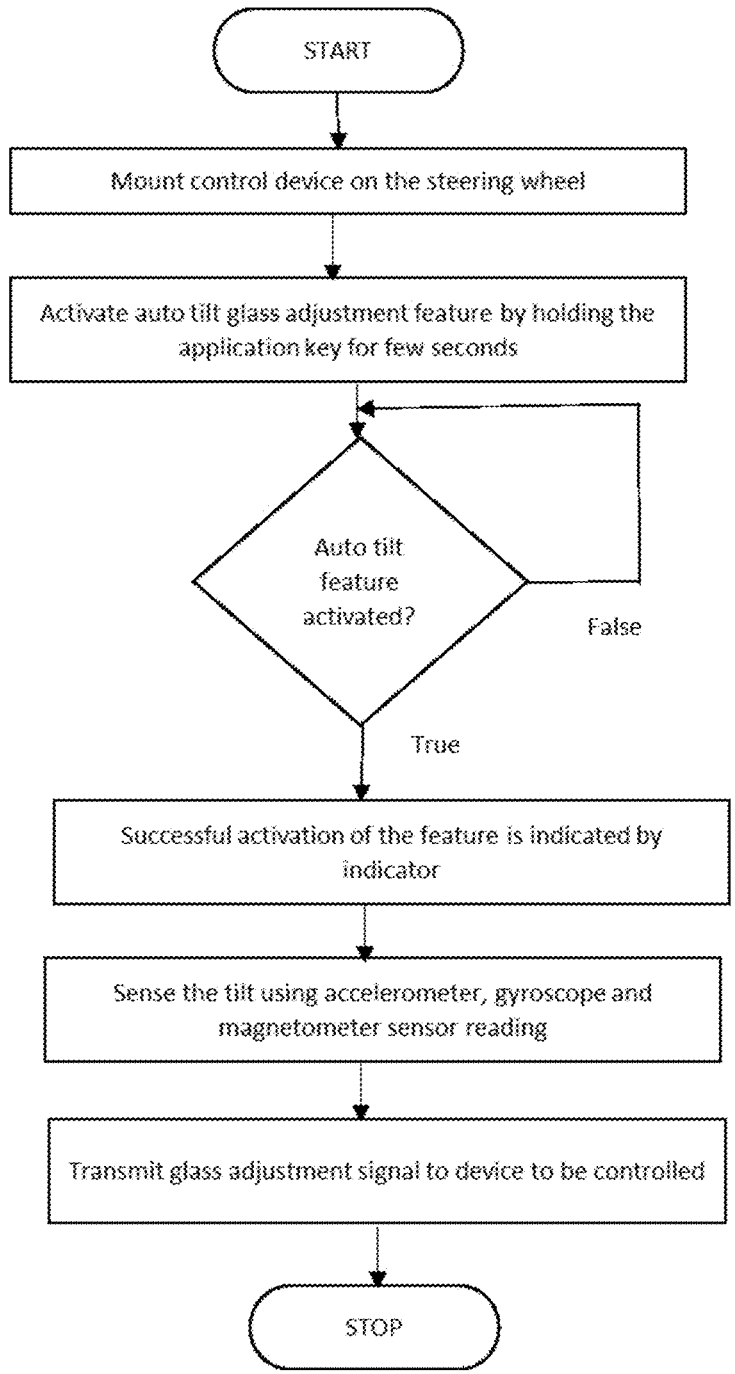
FIG. 9 represents a flow chart illustrating a process of motion based automatic glass adjustment according to the present disclosure.

In another variation of the disclosure, the device can be mounted on the steering wheel (32) as shown in FIG. 8. When the user selects a control application that corresponds to activation of the steering auto tilt based control, the indicator shows a first appearance state and the microcontroller activates the sensors. The accelerometer (5), gyroscope (4) and/or magnetometer (6) sensors in the device (1) can sense the steering wheel tilt. The sensors detects the device position coordinates based on the steering angle tilt, an algorithm decodes the sensor data and the positional information data is transmitted to the micro controller, the micro controller processes the positional information and transmit the control signal wirelessly to the ECU of the device to be controlled to control the positioning of the glass to enable a better view to the user or driver while making a turn as it is sometimes difficult for the driver to view all obstacles in rear view mirror. The signal transmission is indicated as the second appearance state on the indicator. Further, the microcontroller (3) of the control device is configured to identify, from the control signal wirelessly received from the device to be controlled a change in the reflective element position of the device in response to the request and activate the active state indicator icon (21) which displays a third appearance state on the display area. The hand held device can mounted on a steering wheel (32) by a fastening means. The fastening means comprises any one among lockable clips or hooks. FIG. 9 represents a flow chart illustrating a motion based automatic glass adjustment by mounting the control device on the steering wheel. On selecting the steering auto tilt control application the auto tilt feature gets activated. Successful activation is indicated by the active state indicator. The glass adjustment feature is transmitted to the device to be controlled.

Figure 10:
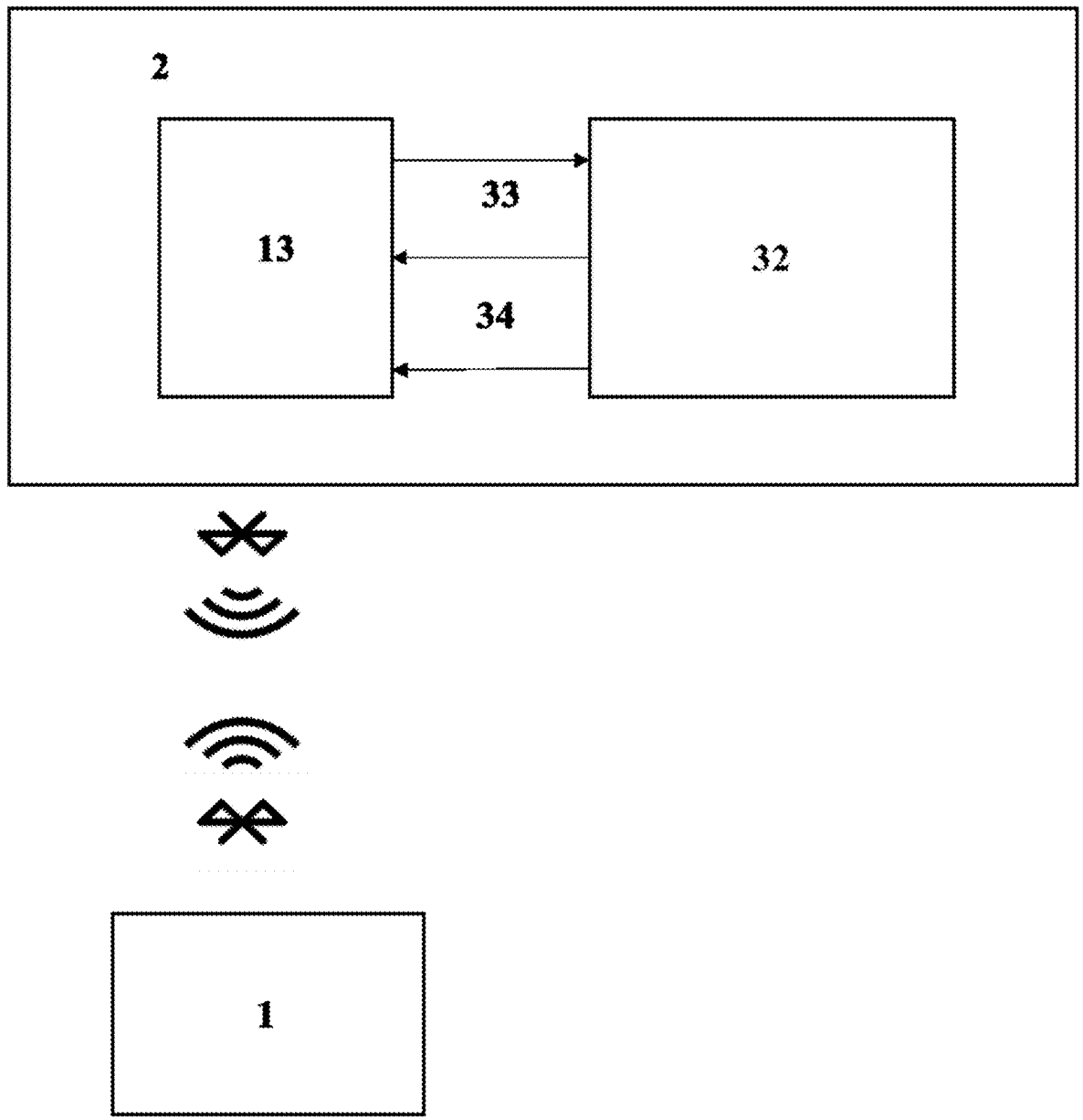
FIG. 10 shows a mechanism of glass actuator position sensing according to the present disclosure.

FIG. 10 shows a mechanism of glass actuator position sensing and working of automatic reflective element positions adjustment using the sensors. The device to be controlled ECU (13) is interfaced with potentiometer (32) which are present inside the glass actuator and any change in reflective element positions in horizontal or vertical directions would lead to corresponding changes in the potentiometer voltage values represented as pot-X (33), pot-Y (34)) which is constantly read by a MCU of the device to be controlled (2). The MCU converts the Pot-X (33) and Pot-Y (34) voltage values to coordinate values and on a wireless read request this coordinate positions are transmitted over wireless communication channel to the control device (1). The control device can also send the desired coordinate position value on a wireless write request for which the device to be controlled has to be adjusted. A bidirectional communication channel is thus established from ECU (13) to control device (1) and vice versa thus ensuring higher accuracy.

Figure 11:
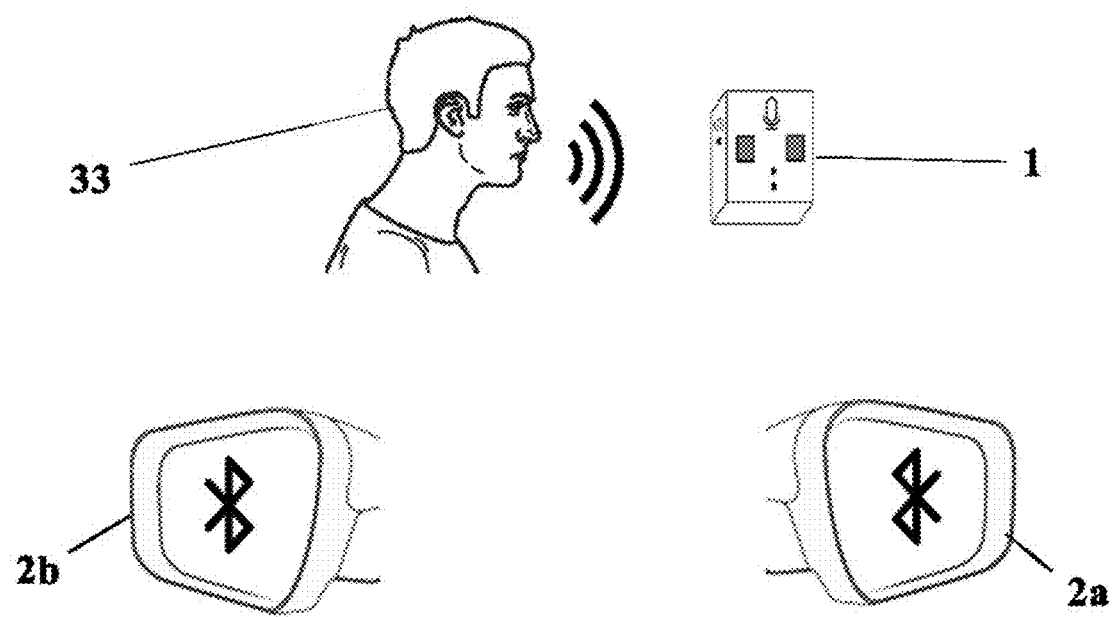
FIG. 11 represents voice control feature as disclosed in the disclosure according to the present disclosure.

In another variation of the disclosure, the control device enables the user to operate all features of the device to be controlled over voice control mode as represented by FIG. 11. When the touch gesture on the control device (1) display is for activation of a command for voice control, a voice control icon on a sub display area prompts the user (33) to speak into the microphone (7). The successful activation of voice control mode is being indicated to user by the active state indicator (21). Voice control enables individual mirror selection to control functions as powerfold in/out, glass position adjustment, heating, dimming, glass position memory save and glass position memory recall and/or cleaning. The control device MCU (3) is interfaced with the microphone to receive the voice commands. A voice recognition software decodes voice commands and compares it with stored voice commands, generates a function identifier value for application specific activation or deactivation and transmits the appropriate control signals to respective device to be controlled via wireless communication. The microcontroller is configured to identify, from a signal wirelessly received from the device to be controlled that the function in response to the request and activate the active state indicator icon (21) to highlight a color i.e. exhibits an appearance state. For example a voice command to increase heating indicated as "increase heating" will adjust heating to a level 1 and on further reception of same command will adjust heating to level 2 and so on. When on level 2 of heating a decrease heating command is received, it will adjust the heating to level 1. Switch off heating command is to switch off the heating completely. When the selected function becomes active the indicator highlights a color to show that the selected function has been activated. Following are few other voice command examples "fold in" to move the mirror in park position, "fold out" to move the mirror in drive position, "Up" to move glass position in upward, "Down" to move glass position down, "Save Memory" to save the glass position, "Retrieve Memory" to move to the memory position, "Heater ON" to turn on the heater, "Heater OFF" to turn of the heater, Turn off mirror heating, Increase mirror dimming, "Decrease mirror dimming" and "Turn off mirror dimming". The control device can have a speaker (9) for a user feedback about identified and processed commands. For example, if user has activated voice commands and send the power fold in command "Fold in" and if the command has been successfully sent to the device to be controlled after processing then control device can send audio output through the speaker (9) as "Fold in completed" or similar.

The voice data is stored in a non-volatile storage device which can be compared with the voice data received in real time by the control device microcontroller, interfaced with microphone (9). The non-volatile storage device could be an internal memory of microcontroller or an external flash memory interfaced with microcontroller, in case the device is a custom build device with MCU, microphone, sensors and wireless communicator and does not consist of any operating system like Android. In case of Android or any other smartphone device, non-volatile storage device could be the internal (built in storage space) or the external flash memory such as memory card inserted in the device. For voice based control the device can have two option, the first being the device non-volatile memory comes with pre-installed standard voice commands where the data stored are preinstalled or stored device external or internal memory. This may be done during production. The second being the control device disclosed by the disclosure integrates a learning function wherein the device provides an option to the user to train the control device with voice commands and map it with a specified feature or functionality. In the case of smartphone application, it has a voice configuration setting button that may have a train button associated with it and user can press to speak and the received voice data can be saved for the future use. The smartphone application can provide multiple voice commands and associate it with single function activation or deactivation. The user may have option to modify, delete and add voice command and link it with specific feature or functions to control the device to be controlled. For the custom made control device without any operating system, the device can coordinate with the smart phone to store voice control functions as android application on smartphone will be enabled communicate with the control device wirelessly. The device can be programmed with voice read and write wireless service and this service provides receiving voice data and unique identifier associated with the function by the smartphone application over wireless channel. The device after receiving the voice data can write this data in the external flash memory. The device can send notification to the smartphone application after storing the data in the external flash memory. The number of voice commands that can be stored depends on the memory size of the smartphone device storage or the device external flash memory.

Figure 12:
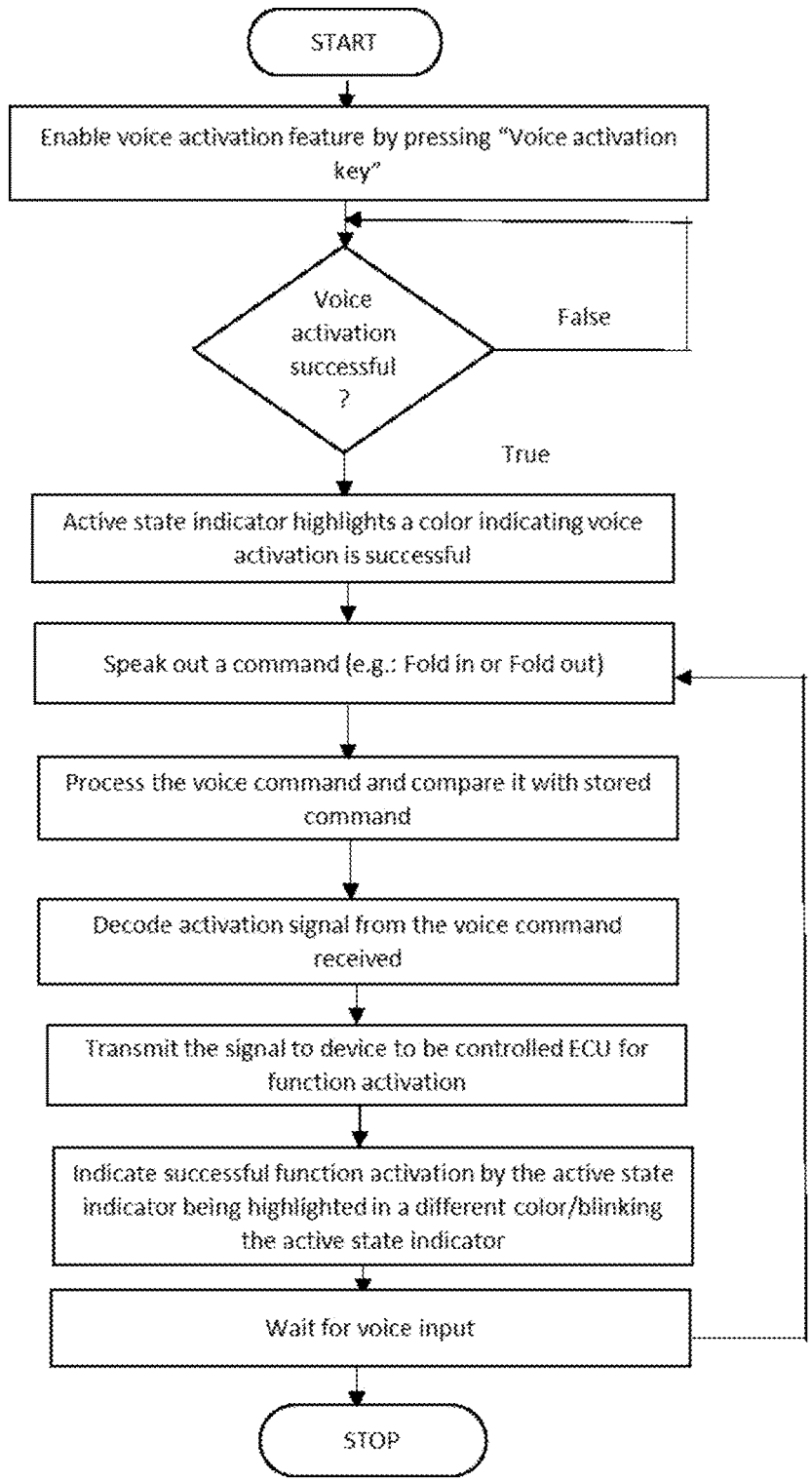
FIG. 12 represents a flow chart illustrating a process of voice based activation according to the present disclosure.

FIG. 12 represents a flow chart illustrating a process of voice based activation process in accordance with another variation of the present disclosure. The user needs to select the application relating to voice control on the display. If voice activation is successful, the active state indicator is highlighted for example in a blue colour to indicate that voice activation is successful. The microphone becomes active and prompts the user to speak out a command (eg: fold in or fold out). This voice command is processed and compared with the stored voice commands. This signal is transmitted to the device to be controlled ECU for activation of the command function. On successful completion of the command function the active state indicator begins to blink and the voice output is generated.

Figure 13:
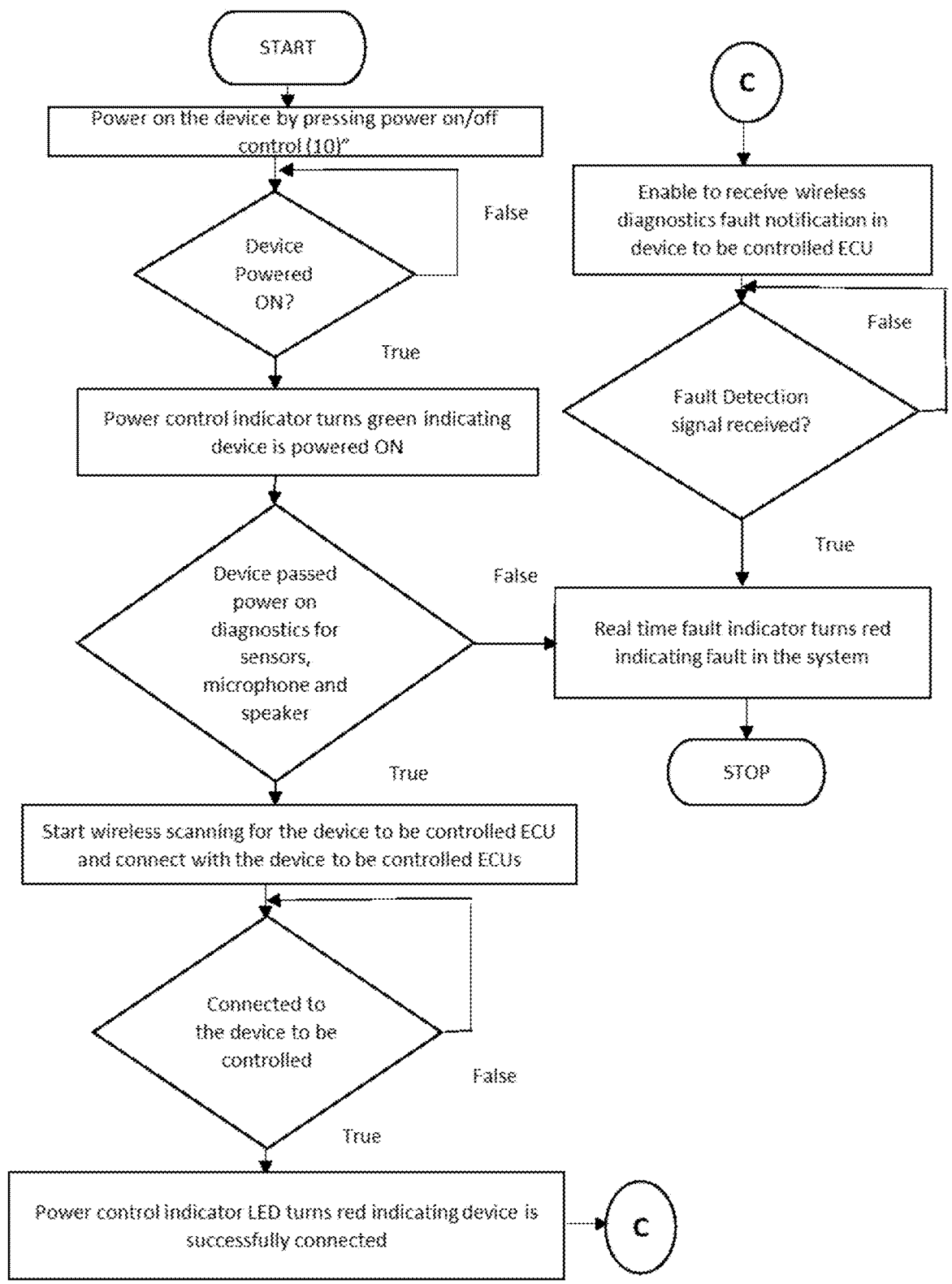
FIG. 13 represents a flow chart illustrating a process of power on and fault detection sequence according to the present disclosure.

In another variation of the disclosure, the control device (1) is able to monitor faults of the device to be controlled wirelessly or those associated with any of the inbuilt sensors, the microphone or other components within the control device. The device to be controlled (2a, 2b) may undergo electrical faults like short circuit, open load i.e. connection between load and ECU is damaged or under voltage faults which may drain the battery by drawing excess amount of current. The faults like short circuit can also lead to fire or other hazards. The monitoring process gets activated automatically when the control device is in the power on state. When the user presses the power on key (23) on the touch display and the control device is successfully activated, the power control indicator (20) highlights a particular colour for example red. The fault detection module runs a fault check on the microphone, the sensors and the speaker. If the microphone, the sensors or the speaker are faulty, the fault indicator highlights a specific colour for example red to indicate presence of the fault. If the monitoring status shows no fault, the control device starts to scan for the device to be controlled ECU. On successful connection with the ECU the power control indicator highlights a different color, for example green. The fault detection module checks for any fault in the device to be controlled and if any fault is detected notifies the user via the fault indicator (22) which highlights a particular colour red. This process of power on and fault detection sequence is represented by a flow chart as shown in FIG. 13.

The microcontroller (3) which in the control device power on state sends a fault detection signal to check the operational status of the device to be controlled and control device components and on receipt of a signal variant from a normal range visually indicates occurrence of a fault to the user on the fault indicator.

There are two approaches by which the faults are monitored and notified, the first approach is real time fault detection. The control device (1) is wirelessly connected to the ECU and it subscribes for wireless notifications for a programmed unique id for various faults. The ECU has half bridge and high side switch drivers which are interfaced to the MCU. On occurrence of fault these drivers raise a flag by changing the voltage level on fault pins which is connected to the MCU and the change is detected on the fault pin, the ECU sends wirelessly the fault notifications to the control device (1). During the second approach, during the power on the control device MCU interfaced to the sensors and the microphone will try to communicate with the sensors and the microphone through standard communication protocols (e.g. I2C and I2S) and if expected response is not received, the device concludes it as a fault. On occurrence of a fault the fault indicator (22) highlights a color or flashes thus notifying the user and the fault occurrence is stored with historical time stamps in the memory (8) and/or Blockchain. In other words the indicator shows the fourth appearance state upon detection of a fault. The user can access these data by a mobile application or a PC interface for further detailed analysis of faults. The different color indications by the indicators can be customized by the user. During design of the device, the indicators can be allocated for different color indications. For the custom made control device without any operating system, the device can coordinate with the smart phone to customize the indicators as android application on smartphone will be enabled to communicate with the control device wirelessly.

In another variation of the disclosure the device can monitor the condition of the driver or the state of the vehicle. If the vehicle is moving at a very high speed detected based on GPS data by the control device and this in addition to the device motion detected by the sensors when the user tries to use the control device, will automatically activate voice control for controlling the function of the device to be controlled. The device would notify the user about voice command activation as an audio output through the speaker.

In another variation the control device can integrate a self-learning function wherein self-learning of control means and/or control applications provided by the control device, the device to be controlled and/or the vehicle, preferably based on the data transmitted, received, determined, detected and/or extracted. Few instances were self-learning is applied by the control system are based on i. user's voice data and set preferences, ii. user information from phone or any other device, iii. environmental and vehicle data, and iv. user behaviour or condition. In a first instance, the control device based on user's voice data can adjust the reflective element or the device to be controlled as per the user preference by self-learning. For example, a user according to his height and seating position may require to adjust glass position to his preferences. But if the vehicle is used by the multiple user it may require to adjust the position manually more often. The user can be identified by the control device based on the voice command it receives and based on the voice data can adjust the reflective element or the device to be controlled. The system learns from the voice data of the user and reflective element positions stored in the memory. When the device identifies a new user, it stores the user voice data and reflective element positions according to the user preference and adjusts the glass positions according to the stored values. In another instance, the control device can be connected wirelessly with smartphone for different configuration, for example voice commands. The control device can keep track of smartphone's MAC address and self-learn the specific user's adjustment preferences and offer the device to be controlled or reflective element adjustments to user as per the self-learned data.

In a third instance, the control device can obtain the environmental and weather data (for example, temperature, humidity etc.) from the smartphone when connected for configuration. Based on the self-learned data, the control device can suggest the driver to control heating and electrochromic control based on environmental conditions. In a fourth instance, the user condition or behavior linked to different use, gesture or motion of the control device can be stored by the device. For example, the method of movement of the control device by different users will be different like some movements might be longer, shorter or faster in particular directions. This behavioural data or information is stored and linked by the control device to different users. Based on this data or information the control device can be trained to decode the different gestures and decide the correct sequence of actions with reduced data collected from the sensors.

Gradually, the control device can be trained to relate the user and his preferred gestures for various device to be controlled functions control. This thereby increases the accuracy and reduces the speed at which the control device detects, decodes and sends signal to device to be controlled for any function activation.

What is claimed is:

1. A method for remote controlling a device to be controlled provided by a vehicle control device, the method comprising the following steps:
   providing one or more control applications by a control device;
   selecting a control application from the one or more control applications on the control device by a user input;
   indicating the selected control application on the control device in response to the user input into the control device;
   receiving a command in the control device for control of the device to be controlled;
   transmitting a control signal associated with the command from the control device to the device to be controlled; and
   actuating an actuator configured for completing the command based on the control signal;
   wherein the one or more control applications comprise voice control, control device motion, and steering auto tilt.

2. The method according to claim 1, wherein a position, a change of position, a velocity of the change in position or an acceleration of the change in position of the control device is determined for the control device motion and the steering auto tilt.

3. The method according to claim 2, wherein the control device motion is determined by the use of an accelerometer, a gyroscope or a magnetometer.

4. The method of claim 1, wherein providing the one or more control applications comprises displaying a touchable key for each of the one or more control applications and at least one indicator icon on a touchscreen display of the control device.

5. The method of according to claim 4, wherein the at least one indicator icon exhibits:

a first appearance state upon selection of the control application, a second appearance state upon transmitting the control signal, a third appearance state upon controlling the device to be controlled, and a fourth appearance state upon detection of a fault.

6. The method of claim 1, further comprising monitoring the controlling of the device to be controlled based on the control signal and determining whether there is a fault or a correct completion.

7. The method of claim 5, further comprising transmitting, from the device to be controlled to the control device, the fault or the correct completion and indicating the fault or the correct completion as the at least one indicator icon on the display of the control device.

8. The method of claim 1, wherein the device to be controlled is a rear view device and the control signal controls at least one function selected from the group of power folding, position adjusting, heating dimming and cleaning of at least a part of the rear view device.

9. The method of claim 6, further comprising storing the control signal, the selected control application, the control device motion or the determined faults of the controlling of the device to be controlled in a memory or a Blockchain.

10. The method of claim 9, further comprising
receiving, by the control device, data of a vehicle;
determining, by the control device, data of a surrounding of the vehicle;
detecting, by the control device, data indicating a condition of a user in the vehicle; and
extracting, by the control device, data from the memory or the Blockchain,
wherein the receiving, determining, detecting, and extracting are performed when the control device is controlling the device to be controlled or providing the one or more control applications.

11. The method of claim 10, wherein the control device, the device to be controlled or the vehicle are configured to integrate a self-learning function of the control applications based on the data transmitted, received, determined, detected or extracted.

12. A portable, hand held or mountable control device for remote controlling at least one device to be controlled provided by a vehicle comprising:
one or more control applications with at least one indicator icon on a touch sensitive display, wherein the one or more control applications are provided as keys on the display and are selected based on a user input, the one or more control applications comprising voice control, control device motion, and steering auto tilt;
a microcontroller coupled with a wireless communicator, wherein based on the user selected control application, a command is received in the control device for control of the device to be controlled, and the device to be controlled is controlled wirelessly based on the command by a motion of the control device; and
one or more motion and orientation detection sensors, wherein the sensors detect the control device position, the change of position, the velocity of the change in position or the acceleration of the change in position of the control device motion and the steering auto tilt.

13. The control device of claim 12, wherein the one or more motion and orientation detection sensors is an accelerometer, a gyroscope or a magnetometer.

14. The control device of claim 12, wherein the micro controller transmits a selected control signal wirelessly to the device to be controlled based on the control signal.

15. The control device of claim 12, wherein the at least one each indicator icon exhibits a first appearance state upon selection of the control selected application, a second appearance state upon transmitting the control signal, a third appearance state upon controlling the device to be controlled and a fourth appearance state upon detection of a fault.

16. The control device of claim 12, wherein the microcontroller monitors the at least one device during the control device power on state to determine a fault or a correct completion of the controlling and transmits the fault or the correct completion of the controlling via the at least one indicator icon.

17. The control device of claim 12, wherein the control signal, the selected control application, the control device motion, or a determined fault of the controlling of the device to be controlled is stored in a memory or Blockchain.

18. The control device of claim 12, wherein the control signal controls powerfolding, position adjusting, heating, dimming or cleaning of at least a part of the device to be controlled.

19. The control device of claim 12, wherein the device to be controlled is a rear view device comprising a reflective element, a camera and a display element.

20. A system for remote controlling at least one device provided by a vehicle comprising a portable, hand held or mountable control device; and
a rear view device,
wherein a microcontroller coupled to a wireless communicator in the control device transmits a control signal wirelessly to the rear view device,
wherein the control signal is generated by a command in the control device for control of the device to be controlled,
wherein the control device is configured to select one of one or more control applications based on a user input,
wherein the one or more control applications comprise voice control, control device motion, and steering auto tilt,
wherein the rear view device having transceiver means receives the control signal thereby triggering a function for power folding, position adjusting, heating, dimming or cleaning of at least a part of the rear view device based on the control application selected by the user,
wherein the control device microcontroller is configured to identify from the signal wirelessly received from rear view device, the function activation and activates a corresponding indicator icon on the control device,
wherein the control device microcontroller monitors the rear view device during the control device power on state to determine a fault or a correct completion of the controlling and transmits the fault or the correct completion of the controlling via the at least the one indicator icon, and wherein the control signal, selected control application, determined motion of the control device or determined fault of the controlling of the rear view device is stored in a memory or Blockchain.

21. The method of claim 1, wherein the command received in the control device is based on the selected control application.

22. The method of claim 1, wherein the control device is removable from a vehicle and is capable of controlling the device to be controlled from an exterior of the vehicle.

23. The control device of claim 12, wherein the command received in the control device is based on the selected control application.

24. The control device of claim 12, wherein the control device is removable from the vehicle and is capable of controlling the device to be controlled from an exterior of the vehicle.

25. The system of claim 20, wherein the command received in the control device is based on the selected control application.

26. The system of claim 20, wherein the control device is removable from the vehicle and is capable of controlling the device to be controlled from an exterior of the vehicle.

* * * * *